United States Patent [19]

Goldman et al.

[11] Patent Number: 5,018,480
[45] Date of Patent: May 28, 1991

[54] SIMULATED TREE BRANCH FOR SMALL ANIMAL ENCLOSURES

[75] Inventors: Marvin Goldman, Great Neck; Jerome Goldman; Terry Goldman, both of New York; Gerald Phillips, Wantagh; Joseph Pesin, Brooklyn, all of N.Y.

[73] Assignee: Penn Plax, Inc., Garden City, N.Y.

[21] Appl. No.: 207,794

[22] Filed: Jun. 17, 1988

[51] Int. Cl.⁵ ............................................. A01K 31/12
[52] U.S. Cl. .......................................... 119/26; 428/19
[58] Field of Search .................. 119/26, 24; 428/17, 428/18, 19, 20

[56] References Cited

U.S. PATENT DOCUMENTS

| | | | |
|---|---|---|---|
| 562,468 | 6/1896 | Hinman | 119/26 |
| 2,186,351 | 1/1940 | Stojaneck | 428/20 X |
| 2,188,529 | 1/1940 | Corina | 428/20 X |
| 3,163,574 | 12/1964 | Tong | 428/20 X |
| 3,682,753 | 8/1972 | Willinger | 428/20 X |
| 3,829,349 | 8/1974 | Hermanson | 428/20 X |
| 4,082,586 | 4/1978 | Osment | 428/18 X |
| 4,202,922 | 5/1980 | Osment | 428/18 |
| 4,552,093 | 11/1985 | Puckett | 119/26 X |
| 4,573,108 | 2/1986 | Castiglia et al. | 428/20 X |
| 4,590,105 | 5/1986 | Shaffer | 428/20 X |
| 4,742,471 | 12/1988 | Lee | 428/17 |
| 4,781,951 | 11/1988 | Kitamura et al. | 428/17 |

FOREIGN PATENT DOCUMENTS

| | | | |
|---|---|---|---|
| 627913 | 9/1961 | Canada | 428/20 |
| 687153 | 5/1964 | Canada | 119/29.5 |
| 2586584 | 3/1987 | France | 119/29 |
| 1571115 | 7/1980 | United Kingdom | 428/20 |
| 2169198 | 7/1986 | United Kingdom | 428/20 |

Primary Examiner—Gene Mancene
Assistant Examiner—R. Thomas Price
Attorney, Agent, or Firm—Armstrong, Nikaido, Marmelstein, Kubovcik & Murray

[57] ABSTRACT

A decorative simulated tree branch system for small animal enclosures made from thermoplastic. The branch is non-toxic, non-leaching, mite and contamination proof, washable, and waterproof, and a realistic representation of a natural tree branch or piece of drift wood. It is formed from a branch base portion and progressively smaller tributary segments which are approximately cylindrical in shape, and may taper as they extend toward the outer ends, as is the case with a natural branch. One preferred embodiment is well suited as a decorative ornament in fish tanks. A second preferred embodiment adapts the present invention for use as a natural looking perch in bird cages. A universal clip, capable of securely attaching the simulated branch to any type of bird cage bar may be provided with the bird perch embodiment.

14 Claims, 3 Drawing Sheets

SIMULATED TREE BRANCH FOR SMALL ANIMAL ENCLOSURES

BACKGROUND OF THE INVENTION

The present invention relates generally to a decorative tree branch system for small animal enclosures made from plastic. The branch is safe for use with a variety of types of animal life, it is non-toxic, easy to clean and maintain, and a realistic representation of a natural tree branch or piece of drift wood. The present invention in one preferred embodiment is well suited as a decorative ornament in fish tanks (aquariums), terrariums, or small mammal enclosures. A second preferred embodiment adapts the present invention for use as a natural looking perch in bird cages and enclosures.

It is conventionally known to decorate small animal enclosures with various natural and fanciful ornamental objects. Known decorative objects generally used in aquariums include natural and artificial rocks, terraces and cliffs, various types of imitation shipwrecks and other underwater articles, barrels, urns bridges and similar items. Natural and artificial plant material and similar ornamental structures are also known. The ornamental objects aid to enhance the aesthetics of the aquarium and also provide the fish or other aquarium inhabitants with areas to live and hide.

Conventionally, these ornamental items are either formed from natural material, or are simulated in man made material such as ceramics and thermoplastics. Similarly, bird cages and enclosures are generally provided with various ornaments and toys for the birds, made of both natural and man made materials. One essential item found in bird enclosures are perches of various sizes in order to suit the particular type of bird housed in the enclosure. Known perches are formed from wood or thermoplastic, and attached to the bird cage by various means which must be sufficiently strong in order to maintain the weight of the bird.

It is generally recognized that birds in a wild setting, will often perch on tree branches. Also, drift wood is a common material found in both fresh water and salt water environments. In view of this many aquarium and bird hobbyists desire to simulate naturally occurring settings in the wild through the use of natural drift-wood, and bird perches formed from tree limbs. However, natural drift wood and tree branches pose numerous problems to the home hobbyist.

Driftwood or branches from a natural setting may contain toxins, bacteria, minerals, or other contaminants which would be deterimental to maintaining life in an aquarium. Further, the natural material tends to decompose over time, further disrupting the delicate chemical balance required to sustain aquarium life. Additionally, the specific gravity of a tree branch or drift wood is usually not sufficient in order to keep the wood under water in the aquarium. Therefore, it is difficult to arrange an aquarium scene using the natural material since it tends to float to the aquarium surface.

Moreover, when natural tree branches are used in bird enclosures as a perch for birds, or as an ornament in small mammal enclosures similar unsuitable properties are encountered. Birds have a tendency to peck at and attempt to eat their perches. Small mammals also attempt to eat any ornamentation placed in their enclosure. Therefore, toxins or other contaminants found on the natural branch could detrimentally effect the health of a bird or small animal. Also, natural branches tend to produce a suitable habitat for mites and similarly detrimental organisms. The use of natural tree material as a perch or ornamental object can therefore produce a significant adverse affect on the health of the inhabitants of the enclosure.

Further, since space is generally limited in a bird cage or small animal enclosure there is a tendency for everything in the enclosure to become fouled with bird and small mammal droppings. Frequent cleaning is therefor required in order to maintain a clean and healthy environment for the birds or mammals. Natural tree branches are unsuited for such frequent cleaning, requiring constant replacement in order to remove the animal droppings from the enclosure. Finally, natural tree branches are not suited for secure attachment to the inside wall of the bird enclosure. In order to utilize a natural tree branch as a bird enclosure perch it is generally required that the branch be of sufficient size in order to be wedged tightly between two walls of the enclosure. It is difficult to find the suitably sized natural branches for such use.

The present invention was developed in order to overcome the above noted drawbacks which have long been known to plague the home hobbyist attempting to simulate the native small animal environment through the use of real tree branches or drift wood. The present inventors have attempted to overcome the problems faced by the hobbyist and to provide a safe, nontoxic, easy to clean and mount simulated tree and drift wood branch for use in small animal enclosures. The present invention overcomes all the above noted art recognized problems which have limited the use of natural tree material in small animal enclosures, enabling the hobbyist to emulate the small animals' natural habitat using a realistic simulated tree branch system which does not suffer from the drawbacks hindering the use of natural materials by the home hobbyist.

SUMMARY OF THE PRESENT INVENTION

It is an object of the present invention to provide an improved tree branch system which is suitable for use in small animal enclosures.

It is a further object of the present invention to provide a realistic simulated tree branch which can be used as an ornamental object in home aquariums, without detrimentally effecting the health of the aquarium inhabitants and which remains submerged in aquarium water.

It is a further object of the present invention to provide a realistic simulated tree branch which can be used as a perch in bird cages, without detrimentally affecting the health of the bird cage inhabitants, and which can easily be mounted and removed from a cage wall.

The present invention is a simulated tree branch which can be used as a decorative ornament or perch in small animal enclosures. The invention functions as a substitute for natural tree or driftwood material in small animal enclosures which are adapted in order to emulate a natural environmental setting. The simulated branches may be placed in an aquarium in order to imitate a natural underwater habitat. Further, the simulated branches can be mounted to the inner wall of a bird cage in order to provide a natural looking perch within the cage.

The present simulated branch is formed in the manner of a natural tree branch, with an initial base portion which divides into progressively smaller tributary segments. The branch base portion and segments are approximately cylindrical in shape, and may taper as they extend toward the outer ends, as is the case with a natural branch. The simulated branch may be formed from two or more tributary segments from the base portion to simulate twigs on a branch, and subtributary segments branching from the tributary segments. Depending upon the size of the simulated branch, and the size of the enclosure into which it is intended to fit, it is preferable to have 3 to 10 tributary and subtributary segments of various sizes, divided from the base portion and from other tributary segments closer to the base portion.

The size of the simulated branch is not critically limited, but may be adapted based upon the conventional sizes of fish tanks and bird cages. Based upon this factor an overall length of between six inches and four feet, and a maximum width (the farthest distance between two outside tributary segments) of between three inches, and two feet. The diameter of the base portion may range from about one half inch to about four inches. The tributary segments are formed progressively smaller as the distance from the base portion increases. The ends of the tributary segments, which do not branch into further subtributary segments may come to a point, in the manner of a bud tip at the end of a twig, or be formed to have the appearance of a broken twig.

Since the branches are intended to simulate real tree material as closely as possible each branch segment may have one or more bends, twists, broken nubs, areas of surface decomposition, or other features which would imitate natural wood. The surface of the branch may be smooth in texture. However, it is preferable if the surface of the branch is textured in the manner of a natural branch with realistic looking lines and markings. Further, knots, lumps, holes, bud and leaf scars, and other natural surface markings and features may also be formed as part of the surface texture of the simulated branch.

Additionally, surface texture may be used in order to approximate the appearance of real tree material under varying conditions. A living branch may be simulated by providing a texture which is similar to bark. Weathered wood, and drift wood could also be approximated by simulating features such as erosion lines, broken ends, and decomposed areas. The coloring of the simulated branch may also be adapted in order to suit the appearance of a particular type of natural wood. Mixtures of browns, grays, oranges, tans and blacks in mottled or variegated patterns may be adapted to closely approximate the coloring of a natural branch.

In order to accomplish the objectives noted above for the present invention it is essential that the simulated branch be formed from a material which is non-toxic, non-leaching, mite and contamination proof, washable, and waterproof. Further, the material must be non-decomposable under normal conditions, break resistant, and have sufficient strength to deter small mammals and birds from eating the material. Thermoplastics are perfectly suited for use in the formation of the present simulated branch. In addition to meeting the above noted requirements, thermoplastics may be readily molded, and colored in order to provide the required natural appearance. Thermoplastics such as polypropylene, certain polyethylenes, styrene, ABS, or similar materials may be suitably used as long as they do not have properties which would interfere with the stated objectives for the use of the simulated branch.

Thermoplastic material does have a drawback for use in an aquarium setting since it is generally buoyant in water. Therefore, further adaptation is required in order to produce an embodiment of the simulated branch which would be suitable for fish tank use. It is known in the art to mix thermoplastic with another material such as talc, in order to render it suitable for use as an aquarium ornament. See, U.S. Pat. No. 4,318,945, issued to three of the present joint inventors, concerning rendering a simulated rock assembly non-buoyant by mixing polypropylene and talc. It is preferable if the thermoplastic is mixed with talc in order to achieve a specific gravity which is more than 1. The use of talc in an amount which approximates 40% by weight to the weight of the thermplastic is generally sufficient to make the branch non-buoyant.

The simulated branches of the present invention may be formed in any conventional thermoplastic molding process. It is preferable if conventional injection molding techniques are used since they are suitable for producing sufficient quantities of the simulated branches. It is critical that the mold used to form the simulated branch be suitably detailed in order to provide the realistic tree branch appearance which is an object of the present invention. Additionally, the colors of the thermoplastics used should be chosen in order to approximate the coloring of natural tree material.

In the second embodiment which can be used as a bird cage perch it is necessary to form an attachment means at the back end of the base portion in order to secure the simulated branch to the inner wall of a bird enclosure. The attachment means must be sufficient to secure the simulated branch in a manner so that it will withstand the weight of one or more birds as well as the weight of the simulated branch itself. Further, the construction of bird cages is not uniform and it is preferable if the attachment means will work suitably on conventional bird cage structures. The most common construction features parallel bars which are oriented in either a vertical or horizontal direction.

A number of differing attachment means are possible for attaching perches in bird cages and are generally known in the art. The selection of an attaching means is not as critical when the simulated branch is large enough to reach across the entire cage and be wedged in between bars on either side of the cage. The inventors have found that with these large size simulated branches it is preferable if the end of the base portion is forked into two prongs which facilitate wedging the back end of the base portion between horizontal or vertical bird cage bars.

When the simulated branch not of sufficient size to extend between two or more walls of the bird cage it is critical that a suitable attachment means be used. The inventors have found it preferable to use a universal clip, capable of securely attaching to any type of bar system and which allows for easy removal for cleaning. The inventors have found that a universal clip which has been specifically developed for the present simulated branch provides the most preferable attaching means.

The novel universal clip preferably used with the bird cage perch embodiment of the present simulated branches has three parts. A "T" shaped projection is formed from the back end of the base portion of the simulated branch. The post of the "T" is fixed to the end of the base portion, and the top of the "T" is formed at the end of the "T" post farthest from the end of the base portion of the simulated branch. In this arrangement there is a gap space on either side of the post of the "T", defined by the top of the "T", one side of the post of the "T" and the end of the base portion of the simulated branch.

The universal clip also has two independent flat clip pieces, each with a cutout channel formed therein, extended from an outer surface of the flat clip piece toward its interior, to a distance of about one half to three quarters of the length of the flat clip. The width of the cutout channel is made to correspond to the width of the post of the "T" extending from the base portion of the simulated branch. The size of the cutout channel is sufficient in order to securely fit over the post of the "T".

Additionally, the depth of the flat clip piece is adjusted so that both clip pieces may be fit on the post of the "T", and be securely wedged between the back end of the base portion of the simulated branch, and the inner surface of the top of the "T". The use of a thermoplastic to form the flattened clip pieces allows for a degree of flexibility in the material in order to accommodate varying sizes of bird cage bars. Conventional bird cage bars are generally consistent in design and the proper size is readily determinably. Ridges may be formed on at least one of the flattened clip pieces, on the surface which will contact the bird cage bars, in order to facilitate secure attachment. Also, a flange portion may be formed at approximately a right angle extending from one side of the flattened clip in order to aid in securing and removing the clip. The flange will be formed on the side of the flattened clip opposite the side which will contact the bird cage bars.

In use the novel universal clip functions to securely, and removably attach the branch to the interior of the bird cage. The "T" shape extension is positioned so that the length of the "T" top is parallel to the direction of the bird cage bars, and the "T" extension is inserted through the bars from inside the cage to the outside. Once the "T" top is through the bars, the branch is rotated so that the "T" top is perpendicular to the bird cage bars. The simulated branch then extends into the interior of the bird cage, and the "T" shaped extension protrudes from the end of the base portion of the simulated branch projecting through the bars to the outside of the cage.

In order to secure the simulated branch in place, one of the flattened clip pieces is placed with its cutout channel over the post of the "T", on the inside of the cage, between the bird cage bars, and the back end of the base portion of the simulated branch. The second flattened clip piece is placed so that its cutout channel is over the "T" post on the outside of the cage, between the outside surface of the bars, and the inner surface of the top of the "T". In this arrangement a sandwich is formed over the "T" post with the following order from the outside of the cage; top of the "T", flattened clip piece, cage bars, second flattened clip piece, base portion of the branch. In this manner the universal clip of the present invention securely maintains the simulated branch on the bird cage wall, and can withstand the weight of one or more birds perched on the branch. Further, the universal clip allows for the easy removal of the simulated branch from the cage, by removing the flattened clip pieces.

BRIEF DESCRIPTION OF THE DRAWINGS

The above and other objects and the attendant advantages of the present invention will become readily apparent by reference to the following detailed description when considered in conjunction with the accompanying drawings wherein.

Like reference refer to like parts throughout the several views of the drawings.

DETAILED DESCRIPTION OF THE PREFERRED EMBODIMENT

Figure 1:
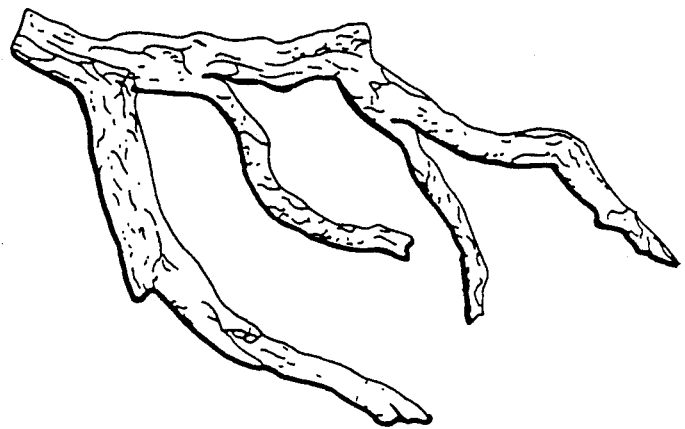
FIGS. 1, 2, and 3 are perspective views of various forms the preferred embodiment of the present invention may take in simulating natural tree material.
Figure 2:
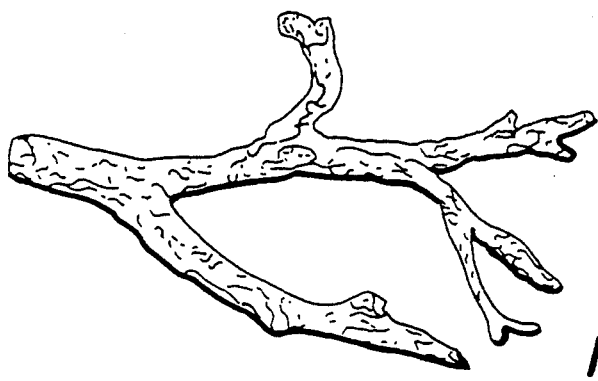
Figure 3:
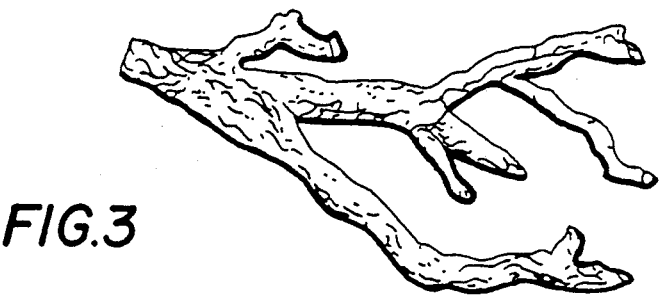

FIGS. 1, 2, and 3 show perspective views of the preferred embodiment of the present invention. The simulated branch is designated 1. The base portion 3 divides into progressively smaller tributary segments 5. The base portion 3 and tributary segments 5 are approximately cylindrical in shape tapering toward the ends. The subtributary segments 7 branch from the tributary segments 5 closer in toward the base portion 3. The figures illustrate four to 6 tributary and subtributary segments. The illustrated embodiment also shows broken twig ends 9, branch bends and twists 11, broken nubs 13, and areas of decomposition or holes 15. Branch points are designated 17.

Figure 4:
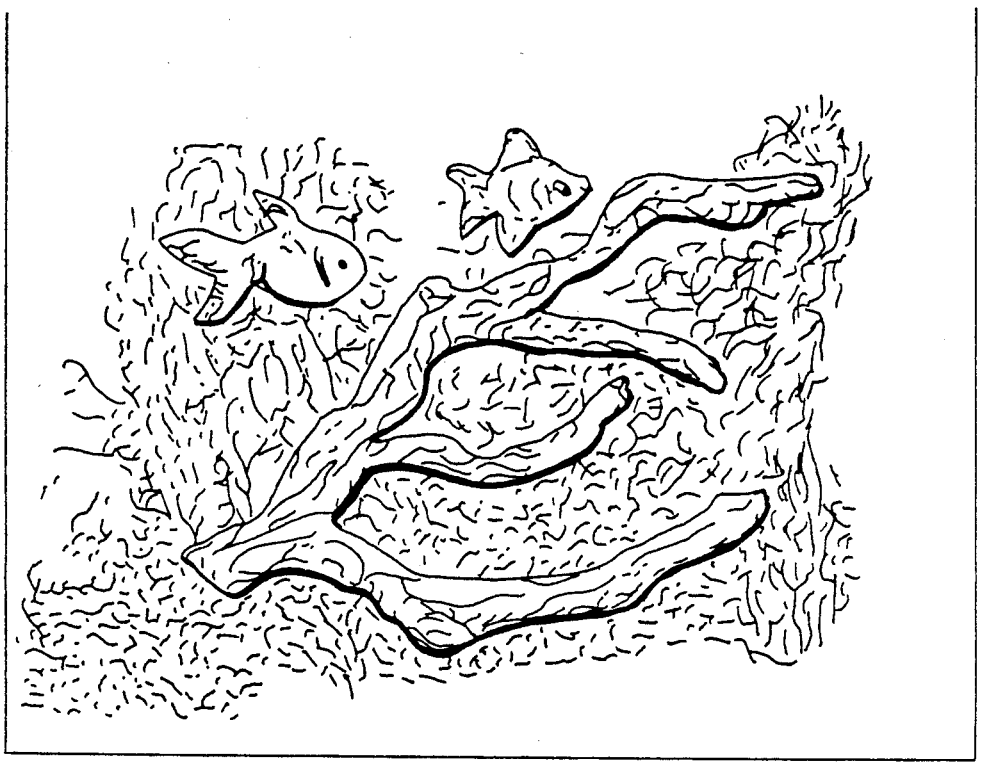
FIG. 4 illustrates the aquarium embodiment of the present invention as submerged under the water of an aquarium.

FIG. 4 depicts the aquarium embodiment of the present invention. As illustrated the simulated branch is submerged under the water of the aquarium. Based upon the composition of the material from which the simulated branch is formed, the branch has a specific gravity which renders it non-buoyant. Because of this, attachment to the aquarium bottom is not required.

Figure 5:
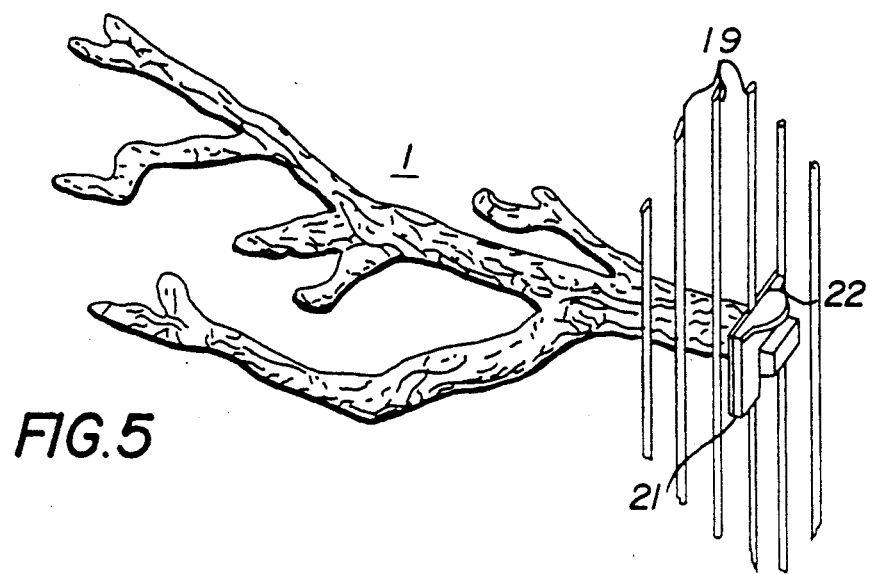
FIG. 5 the bird cage perch embodiment of the present invention mounted to the wall of a bird cage.

FIG. 5 illustrates the bird cage perch embodiment of the present invention. The simulated branch 1 is attached to the bird cage bars 19. The universal clip 21 secures the simulated branch to the wall of the bird cage so that the simulated branch projects into the bird cage. The sandwiched arrangement 22 of the universal clip is also illustrated.

Figure 6:
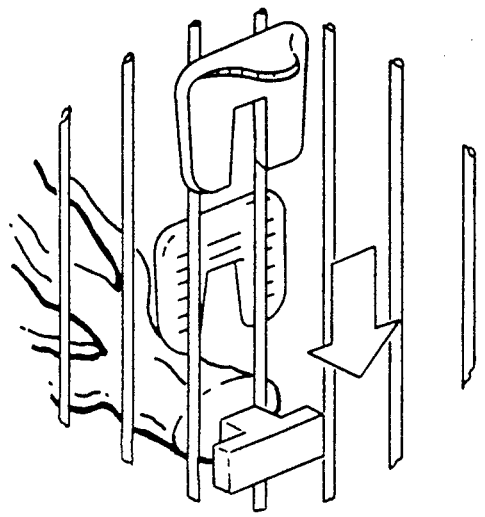
FIGS. 6, 7, and 8, illustrate the preferred universal clip means of the present simulated branch.
Figure 7:
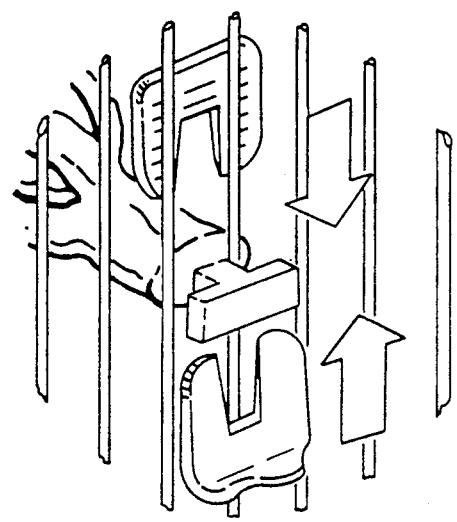
Figure 8:
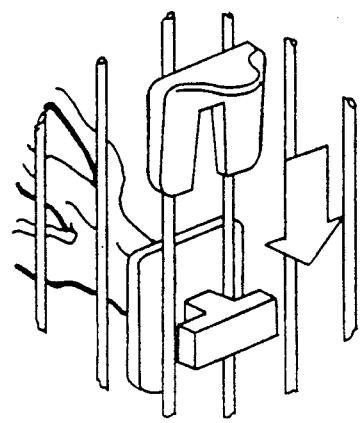

FIGS. 6, 7 and 8 further illustrate the universal clip mechanism 21 attaching to the bird cage bars 19. The "T" shaped projection 23 is inserted through the bird cage bars 19 to the outside of the cage. It projects from the back end of the base portion 25 of the simulated branch. The post of the "T" 27 attaches to the back end of the base portion 25 of the simulated branch, and passes through the bird cage bars. The top of the "T" 29 is fixed on the opposite end of the post 27. The "T" top 29 is outside the cage bars 19 when the simulated branch is attached to the cage. There is a gap space 31 around the post of the "T" 27 between the base portion 25 of the simulated branch and the top of the "T" 29.

The flattened clip pieces 33 and 35, are placed on either side of the bird cage bars 19. A cutout channel 37 is formed in the flattened clip pieces 33 and 35. The cutout channel 37 is of sufficient size to fit over the post of the "T" 27. The depth of the flattened clip piece 39 is of a size which will allow for both flattened clip pieces, and the bird cage bars 19 to fit between the base portion 25 of the simulated branch and the top of the "T" 29 when the flattened clip pieces 33 and 35 are engaged. Ridges 41 are formed on the inner surface 43 (the surface contacting the bird cage bars 19) of flat clip piece 33. A flange portion 45 extends at approximately a right angle from the outer surface 47 (surface which will not contact the bird cage bars) of flat clip piece 35.

In FIGS. 6 and 7, alternative methods of placing the flattened clip pieces 33 and 35 are illustrated. An advantage which is achieved by the novel universal clip is the ability to place the flattened clip pieces at a variety of angles in relation to each other and the bars of the bird cage. This feature of the present invention allows the universal clip to be used on a wider variety of cage structures, and allows for greater variety in the arrangement of other bird accessories near the perch. In FIG. 8, flat clip piece 33 is in place within the bird cage.

It is readily apparent that the above described simulated branch meets all the objectives mentioned and also has other advantages for use in the aquarium. It should be understood that the specific form of the invention hereinabove described is intended to be representative only, as certain modifications within the scope of these teachings will be apparent to those skilled in the art of aquarium decoration and bird perches.

Accordingly, reference should be made to the following claims in determining the full scope of the invention.

What is claimed:

1. A simulated tree branch comprising a base portion, and a plurality of progressively smaller tributary segments which divide in a branching manner therefrom, both the base portion and tributary segments having a shape which is approximately cylindrical, variable within the limits of representing real tree material, and the base portion and tributary segments having a plurality of natural tree features molded therein which simulate real tree material, wherein the natural tree features are selected from at least one member of the following group consisting of, subtributary segments, bends, twists, knot markings, bark texture, points, lumps, holes, bud and leaf scars, bud tips at the end of a twig, broken nubs, areas of surface decomposition, erosion lines, broken ends, and a taper as the tributary segments extend toward the outer ends, said branch being made from non-toxic, non-leaching, waterproof, mite and contamination proof, washable thermoplastic material, and a means formed on one end of the branch, for removably attaching the simulated tree branch to bars of a bird cage, so that the attaching means can support the weight of at least one bird, wherein the means formed on one end of the branch, for removably attaching the simulated tree branch to the bars of a bird cage, comprises a "T" shaped projection extending from a back end of the base portion of the simulated branch, the "T" shaped projection having a post which is attached at one end thereof to the back end of the base portion of the simulated branch and a "T" top attached to an opposite end of the post perpendicular thereto, and two removably engagable flattened clip pieces, the flattened clip pieces having a cutout channel of sufficient size to fit over the post of the "T" and having a sufficient depth so that they may be securely wedged between the top of the "T", and the back end of the base portion of the simulated branch, with bars of a bird cage sandwiched therebetween.

2. The simulated tree branch of claim 1, wherein the thermoplastic is mixed with from 1 to 40% talc and has a specific gravity making it non-buoyant in water.

3. The simulated tree branch of claim 2 wherein the thermoplastic material is of at least two colors, and molded in a manner so as to produce a surface pattern which is mottled.

4. The simulated tree branch of claim 3 wherein the colors are chosen from at least two of brown, gray, orange, tan and black.

5. The simulated tree branch of claim 2 wherein the thermoplastic material is of at least two colors, and molded in a manner so as to produce a surface pattern which is variegated.

6. The simulated tree branch of claim 5 wherein the colors are chosen from at least two of brown, gray, orange, tan and black.

7. The simulated tree branch of claim 1 wherein the thermoplastic material is of at least two colors, and molded in a manner so as to produce a surface pattern which is mottled.

8. The simulated tree branch of claim 7 wherein the colors are chosen from at least two of brown, gray, orange, tan and black.

9. The simulated tree branch of claim 1 wherein the thermoplastic material is of at least two colors, and molded in a manner so as to produce a surface pattern which is variegated.

10. The simulated tree branch of claim 9 wherein the colors are chosen from at least two of brown, gray, orange, tan and black.

11. The simulated tree branch of claim 1 wherein at least one of the flattened clip pieces has ridges formed on an inner surface thereof.

12. The simulated tree branch of claim 1 wherein one of the flattened clip pieces has a flange projecting from the outer surface thereof.

13. A bird cage perch simulating natural tree material, comprising a base portion, and a plurality of progressively smaller tributary segments which divide in a branching manner therefrom, both the base portion and tributary segments having a shape which is approximately cylindrical, variable within the limits of representing real tree material, and the base portion and tributary segments having a plurality of natural tree features molded therein which simulate real tree material, wherein the natural tree features are selected from at least one member of the following group consisting of, subtributary segments, bends, twists, knot markings, bark texture, points, lumps, holes, bud and leaf scars, bud tips at the end of a twig, broken nubs, areas of surface decomposition, erosion lines, broken ends, and a taper as the tributary segments extend toward the outer ends, and a means for removably attaching the simulated tree branch to bars of a bird cage, formed on one end of the perch, so that the attaching means can support the weight of at least one bird, wherein the means for removably attaching the simulated tree branch to bars of a bird cage is a universal clip comprising a "T" shaped projection extending from a back end of the base portion of the simulated branch, the "T" shaped projection having a post which is attached at one end thereof to the back end of the base portion of the simulated branch and a "T" top attached to an opposite end of the post perpendicular thereto, and two removably engagable flattened clip pieces, the flattened clip pieces having a cutout channel of sufficient size to fit over the post of the "T" and having a sufficient depth so that they may be securely wedged between the top of the "T", and the back end of the base portion of the simulated branch, with bars of a bird cage sandwiched therebetween, said perch being made from non-toxic, non-leaching, waterproof, mite and contamination proof, washable thermoplastic material.

14. The bird cage perch of claim 13 wherein the thermoplastic is a mixture of two colors molded to form a mottled or variegated pattern, and the colors are chosen from at least two of brown, gray, orange, tan and black.

* * * * *